(12) United States Patent
Wang et al.

(10) Patent No.: US 11,475,777 B2
(45) Date of Patent: Oct. 18, 2022

(54) METHOD AND APPARATUS FOR CONTROLLING THE OPERATION OF AERIAL UES

(71) Applicant: Lenovo (Beijing) Limited, Beijing (CN)

(72) Inventors: Haiming Wang, Beijing (CN); Jing Han, Beijing (CN); Lianhai Wu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 278 days.

(21) Appl. No.: 16/646,858

(22) PCT Filed: Sep. 28, 2017

(86) PCT No.: PCT/CN2017/103930
§ 371 (c)(1),
(2) Date: Mar. 12, 2020

(87) PCT Pub. No.: WO2019/061140
PCT Pub. Date: Apr. 4, 2019

(65) Prior Publication Data
US 2021/0012665 A1    Jan. 14, 2021

(51) Int. Cl.
*G08G 5/00*    (2006.01)
*B64C 39/02*    (2006.01)
(Continued)

(52) U.S. Cl.
CPC ......... *G08G 5/0013* (2013.01); *B64C 39/024* (2013.01); *G05D 1/10* (2013.01);
(Continued)

(58) Field of Classification Search
CPC .... G08G 5/0013; G08G 5/003; G08G 5/0069; G08G 5/0082; G08G 5/00; B64C 39/024;
(Continued)

(56) References Cited

U.S. PATENT DOCUMENTS

2010/0085236 A1    4/2010   Franceschini et al.
2010/0289659 A1*  11/2010   Verbil ................... G01S 5/0027
                                                            340/670
(Continued)

FOREIGN PATENT DOCUMENTS

CN        105739536 A    7/2016
CN        105867420 A    8/2016
(Continued)

OTHER PUBLICATIONS

LG Electronics Inc., "Aerial Traffic Handling using Positioning Identification" 3GPP TSG-RAN WG2 Meeting #99 R2-1709460, Aug. 21-25, 2017, pp. 1-2.
(Continued)

*Primary Examiner* — Yonel Beaulieu
(74) *Attorney, Agent, or Firm* — Kunzler Bean & Adamson

(57) ABSTRACT

The present disclosure is directed to a method and apparatus for controlling the operation of aerial UEs. An example of the method may include: determining whether an aerial UE is in an autonomous mode or in a non-autonomous mode; determining the flight path information of the aerial UE; and reporting the flight path information of the aerial UE. When the aerial UE is in the autonomous mode, the flight path information is reported when a first reporting period expires or the path deviation of the aerial UE is larger than a deviation threshold. When the aerial UE is in the non-autonomous mode, the flight path information is reported when a second reporting period less than the first reporting period expires or when at least one of the flying direction and flying speed of the aerial UE changes. Embodiments of the present disclosure solve the technical problem concerning the control of the operation of aerial UEs based on various behaviors.

22 Claims, 5 Drawing Sheets

(51) Int. Cl.
*H04W 4/40* (2018.01)
*H04W 4/02* (2018.01)
*G05D 1/00* (2006.01)
*G05D 1/10* (2006.01)

(52) U.S. Cl.
CPC ............ *G08G 5/003* (2013.01); *H04W 4/025* (2013.01); *H04W 4/40* (2018.02); *B64C 2201/141* (2013.01)

(58) Field of Classification Search
CPC .......... B64C 2201/141; B64C 2201/14; B64C 39/02; G05D 1/10; G05D 1/00; H04W 4/025; H04W 4/40; H04W 4/42; H04W 4/44; H04W 4/029; H04W 4/00; H04L 67/125
See application file for complete search history.

(56) References Cited

U.S. PATENT DOCUMENTS

| | | | | |
|---|---|---|---|---|
| 2014/0171106 | A1* | 6/2014 | Cheng | H04W 64/006 455/456.1 |
| 2017/0057634 | A1 | 3/2017 | Hunt et al. | |
| 2017/0061805 | A1* | 3/2017 | Wang | G01S 7/003 |
| 2017/0094590 | A1* | 3/2017 | Wang | H04W 4/30 |
| 2017/0214454 | A1* | 7/2017 | Wang | G01S 13/953 |
| 2017/0272148 | A1* | 9/2017 | Wang | G08G 5/0013 |
| 2018/0172800 | A1* | 6/2018 | Wang | G08G 5/0091 |
| 2018/0376434 | A1* | 12/2018 | Cui | H04W 72/1289 |
| 2019/0043367 | A1* | 2/2019 | Wang | G05D 1/0055 |
| 2019/0147755 | A1* | 5/2019 | Hampel | G08G 5/0008 701/14 |
| 2019/0150053 | A1* | 5/2019 | Wang | H04W 36/32 370/331 |
| 2020/0372806 | A1* | 11/2020 | Wang | H04L 67/18 |
| 2021/0136709 | A1* | 5/2021 | Xu | H04W 56/00 |
| 2021/0201685 | A1* | 7/2021 | Han | G08G 5/0039 |

FOREIGN PATENT DOCUMENTS

| | | |
|---|---|---|
| CN | 105929838 A | 9/2016 |
| WO | 2016033796 A1 | 3/2016 |

OTHER PUBLICATIONS

LG Electronics Inc., "Aerial Traffic Handling using Positioning Identification" 3GPP TSG-RAN WG2 Meeting #98 R2-1705660, May 15-19, 2017, pp. 1-2.

European Patent Office, "Extended European Search Report", dated Apr. 9, 2021, pp. 1-11.

PCT/CN2017/103930, "International Search Report and the Written Opinion of the International Searching Authority/CN", PCT International Search Authority/CN, State Intellectual Property Office of the P.R. China, May 29, 2018, pp. 1-6.

* cited by examiner

METHOD AND APPARATUS FOR CONTROLLING THE OPERATION OF AERIAL UES

TECHNICAL FIELD

The present disclosure is directed to wireless communication technology, and more specifically relates to the technology about controlling the operation of aerial UEs (User Equipment) during wireless communication.

BACKGROUND

In recent years, aerial vehicles, such as drones are becoming more and more popular. For example, more and more drones are commercially used in package delivery, search-and-rescue, monitoring of critical infrastructure, wildlife conservation, flight cameras, and surveillance. 3GPP (3rd Generation Partnership Project) observes this trend and is interested in introducing aerial vehicles, such as drones, into the wireless network like UEs, i.e., aerial UEs. Consequently, a new study item (SI) "Study on enhanced LTE Support for Aerial Vehicles" was approved by TSG RAN #75, wherein a plurality of enhancements on the aerial UEs are proposed, such as interference mitigation solutions for improving system-level performance in both UL and DL involving aerial UEs, and solutions to detect whether UL signals from an aerial UE in an air-borne state increase interference in neighbor cells and whether an aerial UE in an air-borne state suffers interference from neighbor cells.

However, since the behaviors of aerial UEs are greatly different from conventional UEs, the manner in which to achieve the above enhancements must consider the special behaviors of the aerial UEs. Thus, there is a need for providing a control mechanism for the operation of aerial UEs based on the special behaviors of the aerial UEs.

SUMMARY OF THE PRESENT DISCLOSURE

One object of the present disclosure is to provide a technical solution for controlling the operation of aerial UEs in a wireless network.

According to an embodiment of the present disclosure, a method for controlling the operation of aerial UEs, which may performed on a remote unit such as an aerial UE, may include: determining whether an aerial UE is in an autonomous mode or in a non-autonomous mode; determining the flight path information of the aerial UE; and reporting the flight path information of the aerial UE. When the aerial UE is in the autonomous mode, the flight path information of the aerial UE is reported in one of the case that a first reporting period expires and the case that the path deviation of the aerial UE is larger than a deviation threshold. When the aerial UE is in the non-autonomous mode, the flight path information of the aerial UE is reported in one of the case that a second reporting period less than the first reporting period expires and the case that at least one of the flight direction and flight speed of the aerial UE changes.

In an embodiment of the present disclosure, the first reporting period is substantially in a time level no less than a second, and the second reporting period is substantially in a time level no more than a second. The first reporting period may be indicated by a network entity or may be default. In another embodiment of the present disclosure, the first reporting period may be determined by a first offset period indicated by a network entity and a first default period. Similarly, the second reporting period may be indicated by a network entity, or may be default, or may be determined by a second offset period indicated by a network entity and a second default period.

According to an embodiment of the present disclosure, the flight path information includes at least one of the current position of the aerial UE, the target position of the aerial UE, the flight direction of the aerial UE and the flight speed of the aerial UE.

According to another embodiment of the present disclosure, the method further includes when the aerial UE is in the autonomous mode, a base station nearest to the aerial UE is selected for the aerial UE based on the flight path information of the aerial UE and the location information of base stations associated with the aerial UE when a reference signal receiving power (RSRP) of the base station measured by the aerial UE meets a predefined performance criterion.

According to yet another embodiment of the present disclosure, the method further includes when the aerial UE is in the autonomous mode, a base station is selected for the aerial UE based on the flight path information of the aerial UE and the location information of base stations associated with the aerial UE when a RSRP of the base station measured by the aerial UE is offset better than that of a base station nearest to the aerial UE.

In an embodiment of the present disclosure, the location information of the base stations associated with the aerial UE is stored in at least one of a location server in a core network and a memory of the aerial UE. The location information of the base stations associated with the aerial UE may include one of the following: the location information of the base stations in a current tracking area of the aerial UE; the location information of the base stations in a current neighbor cell list of the aerial UE; and the specific location of a base station requested by the aerial UE.

In another embodiment of the present disclosure, the method further includes when the aerial UE is in the autonomous mode, a threshold of the flight duration in a cell is received. When an actual flight duration of the aerial UE in a specific cell is larger than the threshold of the flying duration in a cell, the specific cell is the target cell to be handed over to and reselected.

According to an embodiment of the present disclosure, the method further includes when the aerial UE is in the non-autonomous mode, the intended flight path information of the aerial UE with a time tag is reported. The method may further include receiving a threshold of intended flight period, and reporting the intended flight path information when the intended flight period of the aerial UE being larger than the threshold of the intended flight period. The method may further include broadcasting the intended flight path information to neighbor aerial UEs of the aerial UE. The intended flight path information may include at least one of the following: a starting time tag, an ending time tag, and the relevant location information of the aerial UE; a starting position, a flight direction, and velocity information of the aerial UE until receiving a command for changing at least one of the starting position, flight direction, and velocity information; and series of discrete positions with time tags.

According to another embodiment of the present disclosure, the method may further include receiving mode switching information indicating the mode switching of the aerial UE between the autonomous mode and the non-autonomous mode. In an embodiment of the present disclosure, the method may further include receiving signaling which indicates the mode switching of the aerial UE between the autonomous mode and the non-autonomous mode. In another embodiment of the present disclosure, the method may further include during a time window, when receiving a control command, determining the aerial UE to be switched from the autonomous mode to the non-autonomous mode; and when no control command being received, determining the aerial UE to be switched from the non-autonomous mode to the autonomous mode.

According to embodiments of the present disclosure, methods for controlling the operation of aerial UEs, which may performed on the network side, such as a base station are provided to control and incorporate with the method for controlling the operation of the aerial UEs performed on the remote unit, for example, the methods stated above. In an embodiment of the present disclosure, the method may include receiving the flight path information of an aerial UE. When the aerial UE is in an autonomous mode, the flight path information of the aerial UE is received in one of the case that a first reporting period expires and the case that the path deviation of the aerial UE is larger than a deviation threshold. When the aerial UE is in the non-autonomous mode, the flight path information of the aerial UE is received in one of the case that a second reporting period less than the first reporting period expires and the case that at least one of the flight direction and flight speed of the aerial UE changes.

In an embodiment of the present disclosure, the method further includes when the aerial UE is in the autonomous mode, a threshold of the flight duration in a cell to the aerial UE is indicated, for example to the aerial UE. When an actual flight duration of the aerial UE in a specific cell is larger than the threshold of the flight duration in a cell, the specific cell may be the target cell to be handed over to and reselected. The method may further include when the aerial UE is in the non-autonomous mode, intended flight path information of the aerial UE with a time tag is received. The method may further include indicating a threshold of intended flight period, and receiving the intended flight path information when the intended flight period of the aerial UE being larger than the threshold of intended flight period.

In another embodiment of the present disclosure, the method may further include signaling the mode switching of the aerial UE between the autonomous mode and the non-autonomous mode. In yet another embodiment of the present disclosure, the method may further include determining the aerial UE to be switched from the non-autonomous mode to the autonomous mode when receiving a complete flight path of the aerial UE.

Embodiments of the present disclosure also provide apparatuses, which can perform the above methods.

Embodiments of the present disclosure solve the technical problem concerning the control the operation of aerial UEs based on various behaviors, and thus can facilitate introducing aerial vehicles into wireless networks as aerial UEs and improve the performance of aerial UEs in wireless communication.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only example embodiments of the present disclosure and are not therefore to be considered to be limiting of its scope.

DETAILED DESCRIPTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

Figure 1:
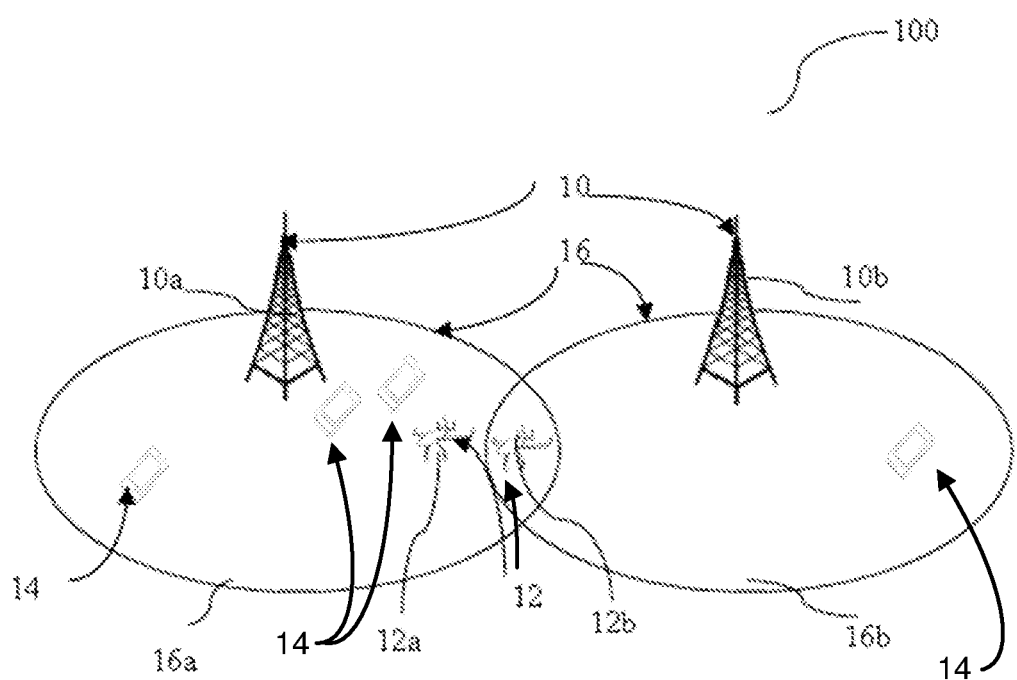
FIG. 1 depicts a wireless communication system with aerial UEs according to an embodiment of the present disclosure.

FIG. 1 depicts a wireless communication system 100 with aerial UEs according to an embodiment of the present disclosure.

As shown in FIG. 1, the wireless communication system 100 includes a plurality of base stations 10 including base station 10a, 10b, a plurality of aerial UEs 12 including aerial UE 12a and aerial UE 12b and a plurality of conventional UEs 14, i.e., terrestrial UEs. The plurality of base stations 10 may be based on LTE/LTE-A/5G or not. For example, the plurality of base stations 10 may be a plurality of eNBs and/or a plurality of gNBs. In one embodiment of the present disclosure, the plurality of base stations 10 may be controlled by a control unit (not shown). Each base station 10 may define one or more cells 16 supporting aerial services or not. The plurality of aerial UEs 12 may be a plurality of drones or other aerial vehicles. The conventional UEs 14 may be computing devices, wearable devices, and mobile devices, etc. Specifically, as shown in FIG. 1, UEs 12a and 12b are aerial UEs 12, while the other UEs are conventional UEs 14. UEs 12a and 12b are both in cell 16a defined by base station 10a. At the same time, UE 12b is also in the edge of cell 16b defined by the base station 10b, that is, UE 12b is simultaneously in cell 16a and cell 16b. Persons skilled in the art should understand that as the 3GPP and electronic technology develop, the terminologies recited in the specification may change, which should not affect the principle of the present disclosure.

Compared with conventional UEs 14 at the ground, for example a mobile phone, the following special behaviors of aerial UEs 12 can be identified: the first one is about flying over the air, which means the aerial UEs 12 are flying above the height of the base stations 10; the second one is about autonomous flying, which means the entire flight path of the aerial UEs 12 is completely known in advance for the aerial UEs 12; and the third one is about the specific behaviors of the aerial UEs 12 enabled by the specific applications of the aerial UEs 12. For example, even in the non-autonomous operation mode, a certain flight direction, flight altitude, and flight pattern etc. of an aerial UE 12 may be known for the aerial UE 12 in the application of building surveillance and other applications.

Since different behaviors of the aerial UEs 12 will cause different problems during the operation of the aerial UEs 12, such as in an autonomous mode, the problems about the practical impacts on effective position information reporting, robust handover and even smart interference control have to be solved; while in a non-autonomous mode, the problems concerning how those specific applications will enable some certain messages for use have to be solved. All these problems are related to the operation of aerial UEs 12, and can be solved by technical solutions according to embodiments of the present disclosure.

According to one embodiment of the present disclosure, a method for controlling the operation of aerial UEs 12, which may be performed in the terminal side, such as an aerial UE 12, may include: determining whether an aerial UE 12 is in an autonomous mode or in a non-autonomous mode; determining the flight path information of the aerial UE 12; and reporting the flight path information of the aerial UE 12. For the aerial UE 12 in the autonomous mode, the flight path information of the aerial UE 12 is reported when a first reporting period expires or when the path deviation of the aerial UE 12 is larger than a deviation threshold. For the aerial UE 12 in the non-autonomous mode, the flight path information of the aerial UE 12 is reported when a second reporting period less than the first reporting period expires or when at least one of the flight direction and flight speed of the aerial UE 12 changes.

According to another embodiment of the present disclosure, a method for controlling the operation of aerial UEs 12, which may be performed on a network entity, such as a base station 10, may include receiving the flight path information of an aerial UE 12. For the aerial UE 12 in an autonomous mode, the flight path information of the aerial UE 12 is received when a first reporting period expires or when the path deviation of the aerial UE 12 is larger than a deviation threshold. For the aerial UE 12 in a non-autonomous mode, the flight path information of the aerial UE 12 is received when a second reporting period less than the first reporting period expires or when at least one of the flight direction and flight speed of the aerial UE 12 changes.

More details on the embodiments of the present disclosure will be illustrated in the following text in combination with the appended drawings.

Figure 2:
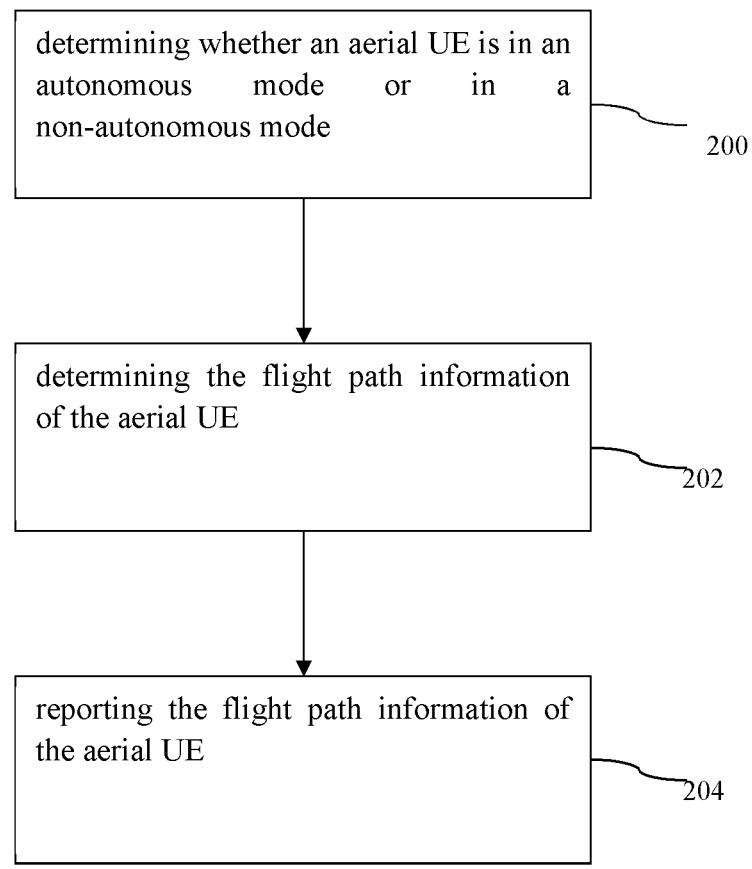
FIG. 2 is a flow chart illustrating a method for controlling the operation of aerial UEs according to an embodiment of the present disclosure.

FIG. 2 is a flow chart illustrating a method of controlling the operation of aerial UEs 12 according to an embodiment of the present disclosure.

The method of controlling the operation of aerial UEs 12 according to an embodiment of the present disclosure may be performed in an aerial UE 12, for example a control unit configured in the aerial UE 12. As shown in FIG. 2, in step 200, whether the aerial UE 12 is in an autonomous mode or in a non-autonomous mode is determined. In step 202, the flight path information of the aerial UE 12 is determined. The flight path information may include at least one of the current position of the aerial UE 12, the target position of the aerial UE 12, the flight direction of the aerial UE 12 and the flight speed of the aerial UE 12. In step 204, the flight path information of the aerial UE 12 is reported to the network side, for example, to the base station 10, which may be in a predefined interval or may be triggered at least one redefined event.

Specifically, when the aerial UE 12 is in the autonomous mode, the flight path information of the aerial UE 12 is reported when a first reporting period expires or when the path deviation of the aerial UE 12 is larger than a deviation threshold, wherein the deviation threshold may be a fixed value predefined in the specification or a value indicated by the network side, for example, the base station 10.

The first reporting period may be indicated by a network entity, such as the base station 10 or may be default. For example, the first reporting period may be predefined in the specification or indicated by the base station 10 when the connection between the base station 10 and the aerial UE 12 is initiated. In one embodiment of the present disclosure, the first reporting period even may be determined by a first offset period indicated by a network entity, such as a base station 10 and a first default period. According to one embodiment of the present disclosure, the first reporting period may be substantially in a time level no less than a second, such as a one second, which is a relatively long reporting interval in wireless communication.

According to an embodiment of the present disclosure, the flight path information of the aerial UE 12 can be used to enhance the handover and cell re-selection of the aerial UE 12, which can be performed by the aerial UE 12 or the network side. In particular, when the location information of the relevant base stations 10, i.e., the base stations 10 associated with the aerial UE 12, also known to the aerial UE 12, the flight path information and the location information of the relevant base stations 10 can be used to minimize the interference to the aerial UE 12. For example, as shown in FIG. 1, for the aerial UE 12a, the base station 10a and 10b are the relevant base stations 10.

In an embodiment of the present disclosure, the location information of the relevant base stations 10 may be stored in a location server in the core network (not shown), which may be required by the aerial UE 12 as necessary or may be indicated to the aerial UE 12 by the core network, for example via signaling. In another embodiment of the present disclosure, the location of the relevant base stations 10 may be stored in the memory of the aerial UE 12. According to one embodiment of the present disclosure, the location information of the relevant base stations 10 associated with the aerial UE 12 may be geographical coordinates and may include one of the following: the location information of the base stations 10 in a current tracking area of the aerial UE 12; the location information of the base stations 10 in a current neighbor cell list of the aerial UE 12; and the specific location of a base station 10 requested by the aerial UE 12.

According to one embodiment of the present disclosure, the base station 10 nearest to the aerial UE 12 may be selected for the aerial UE 12 during cell resection as long as the RSRP of the base station 10 measured by the aerial UE 12 meets the predefined performance criterion. For example, for the aerial UE 12a shown in FIG. 1, the base station 10a nearest to the aerial UE 12a can be selected for the aerial UE 12a when reselecting a cell 16 for the aerial UE 12a. According to another embodiment of the present disclosure, the cell reselection can be performed in a different manner, wherein when the RSRP of a base station 10 measured by the aerial UE 12 is offset better than that of the nearest base station 10, the base station with better RSRP, rather than the nearest base station can be selected for the aerial UE. For example, for the aerial UE 12a shown in FIG. 1, when the RSRP of the base station 10b is offset better than that of the base station 10a nearest to the aerial UE 12a, the base station 10b can be selected for the aerial UE 12a when reselecting a cell 16 for the aerial UE 12a.

In an embodiment of the present disclosure, when more than one cell 16 meet hand over conditions and/or cell reselection conditions of the aerial UE 12, the flight path information of the aerial UE 12 can assist the right target cell decision. That is, further conditions for hand over and/or cell reselection can be defined based on the flight path information of the aerial UE 12. For example, when the flight path information and actual flight speed information is known to the network side for example base station 10, the network will know the actual flight duration of the aerial UE 12 in a specific cell. A threshold of the flight duration in a cell may be indicated by the network side, for example the base station 10, and received by the aerial UE 12, which may be used for a conditional handover of the aerial UE 12. When an actual flight duration of the aerial UE 12 in a specific cell is larger than the threshold of the flight duration in a cell, the specific cell is the target cell to be handed over to and reselected for the aerial UE 12. For a specific cell only supporting short flight duration, i.e., the flight duration of the aerial UE 12 in the specific cell being lower than the indicated threshold of the fight duration in a cell, the specific cell may be removed from the current neighbor cell list of the aerial UE 12, and accordingly the aerial UE 12 will not measure and report the removed cell.

Figure 3:
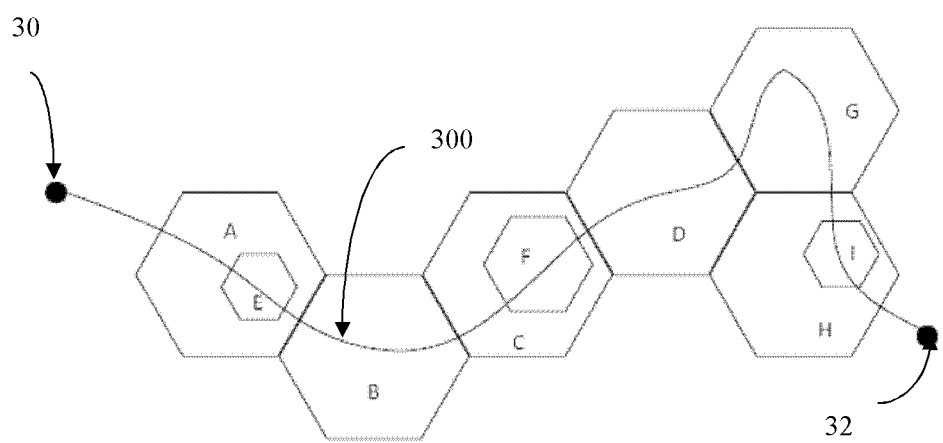
FIG. 3 illustrates a hand over and/or cell reselection scenario based on the threshold of the flight duration in a cell according to an embodiment of the present disclosure.

FIG. 3 illustrates a hand over and/or cell reselection scenario based on the threshold of the flight duration in a cell according to an embodiment of the present disclosure.

As shown in FIG. 3, in the flight path 300 from the starting position 30 to the ending position 32, the aerial UE 12 may fly over the area covered by cells A-H. When the tracking area of the aerial UE 12 is covered by both cell A and cell E and the two cells both meet conventional hand over and/or cell reselection criterions, whether an actual fight duration of the aerial UE 12 in the cell E is larger than the threshold of the fight duration in a cell may be determined, for example by the aerial UE 12. When the actual fight duration of the aerial UE 12 in cell E is smaller than the threshold of the fight duration in a cell, handover from cell A to cell E was prohibited due to the short flight duration in cell E. Similar conditional hand over and/or cell reselection determination also occurs when the aerial UE 12 flies the tracking area covered by cell C and cell F, and the tracking area covered by cell H and I. However, the handover is enabled from cell C to cell F, and from cell H to cell I because the actual flight duration in cell F and H are larger than the defined threshold of the flight duration in a cell respectively. Since the flight path information of the aerial UE 12 is considered, the hand over based on the threshold of the fight duration in a cell is more accurate than conventional hand over manner.

Compared with the autonomous mode, the flight path of the aerial UE 12 in the non-autonomous mode is at least partly uncertain. In some applications, for example, photographing by the aerial UE 12, the flight path may be very uncertain due to the controlling of the ground pilot. However, in some applications, for example, building surveillance, solar panel surveillance and poison spraying etc., partial flight path information, for example, flight area and flight direction may be predicted. According to an embodiment of the present disclosure, when the aerial UE 12 is in the non-autonomous mode, the flight path information of the aerial UE 12 may be reported when a second reporting period less than the first reporting period expires or when at least one of the flight direction and flight speed of the aerial UE 12 changes. Similarly, the second reporting period may be indicated by a network entity, such as the base station 10 or may be default. For example, the second reporting period may be predefined in the specification or indicated by the base station 10 when the connection between the base station 10 and the aerial UE 12 is initiated. In an embodiment of the present disclosure, the second reporting period even may be determined by a second offset period indicated by a network entity, such as a base station 10 and a second default period. According to one embodiment of the present disclosure, the second reporting period may be substantially in a time level no more than a second, such as one millisecond, which is a relative short reporting interval in wireless communication. Based on the technical solutions according to embodiments of the present disclosure, the trajectory of the aerial UE 12 in the non-autonomous mode can also be efficiently tracked and the overhead of reporting flight path information can also be apparently reduced.

According to an embodiment of the present disclosure, for the applications wherein partial flight path information is certain, the intended flight path information of the aerial UE 12 with a time tag may be reported, for example to a network entity like a base station 10, so that short-period flight path information is roughly known to the network side. An example application according to the present disclosure is solar panel surveillance, wherein the solar panel array is monitored by an aerial UE 12, such as a drone along a fixed path under the control of the ground pilot. Thus, although the flight of the aerial UE 12 is not in an autonomous mode, the flight intention of the aerial UE 12 can be partly predicted. The intended flight path information may include at least one of the following: a) starting time tag, ending time tag, and the relevant location information of the aerial UE; b) starting position, flight direction, and velocity information of the aerial UE until receiving a command for changing at least one of the starting position, flight direction, and velocity information; and c) series of discrete positions with time tags.

In another embodiment of the present disclosure, the intended flight path information may also be broadcast to the neighbor aerial UEs of the aerial UE 12.

To control the reporting efficiency and reducing overhead, a threshold of intended flying period may be indicated by the network side for example the base station 10, and received by the aerial UE 12. That is, the network side may define the required shortest period of an intended flight path, which is for judging whether the aerial UE 12 is eligible to report the intended flight path information. The aerial UE 12 reports the intended flight path information only when the intended flight period of the aerial UE 12 is larger than the threshold of intended flight period. For an intended flight path with a period shorter than the required period, the aerial UE 12 will not report it as an intended flight path. That is, that flight path will be regarded as a totally uncertain path. In an embodiment of the present disclosure, the aerial UE 12 may report that it is eligible to report the intended flight path to the network side, for example, the base station 10 by determining its own status based on the received threshold of intended flight period.

Figure 4:
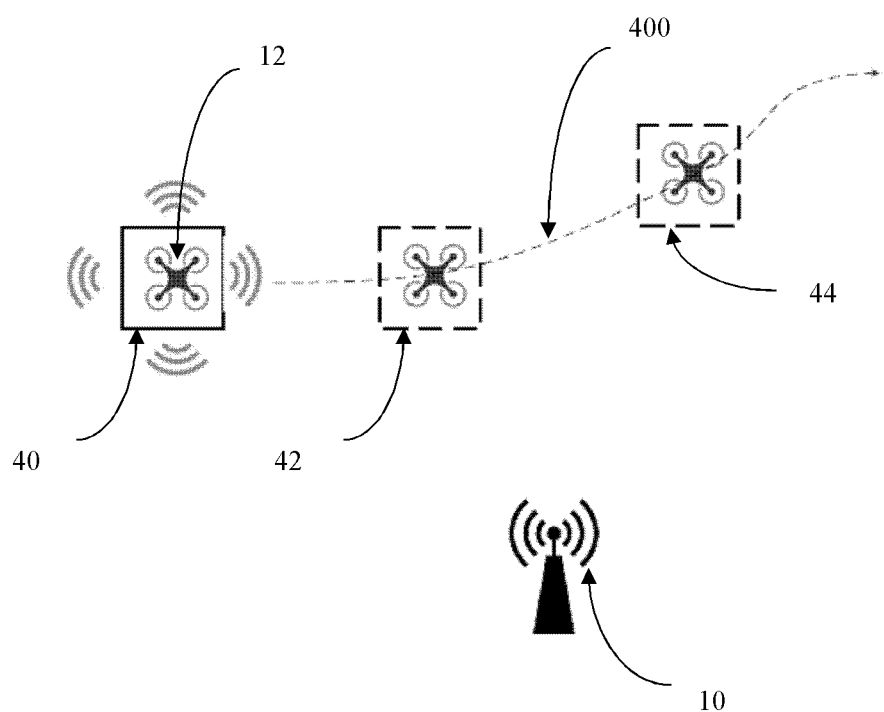
FIG. 4 illustrates a scenario of intended flight path information reporting/broadcasting according to an embodiment of the present disclosure.

FIG. 4 illustrates a scenario of intended flight path information reporting/broadcasting according to an embodiment of the present disclosure.

As shown in FIG. 4, the aerial UE 12 is currently in the first position 40 of the flight path 400 to be flown over. Although the entire flight path information is unknown for the aerial UE 12, the future positions, i.e. the second position 42 and the third position 44 in the flight path 400 are known. The aerial UE 12 may determine whether the respective intended flight period of the aerial UE 12 from the first position 40 to the second position 42 and third position 44 is longer than the threshold of intended flight period received from the network side. When the intended flight period of the aerial UE 12 from the first position 40, i.e., the current position to the second position 42 and/or to the third position 44 is longer than the threshold of intended flight period, the aerial UE 12 may report the second position and/or the third position 44 to the network side, for example the base station 10.

Embodiments of the present disclosure also provide a mode switch mechanism for aerial UEs 12 between the autonomous mode to the non-autonomous mode. According to an embodiment of the present disclosure, the method of controlling the operation of aerial UEs 12 may further include receiving mode switching information indicating the mode switching of the aerial UE 12 between the autonomous mode and the non-autonomous mode. For example, the aerial UE 12 may receive the mode switching information when the ground pilot switches the operation mode of the aerial UE 12, or receives the mode switching information when the network side, for example the base station 1 indicates the mode switching of the aerial UE 12 between the autonomous mode and the non-autonomous mode via signaling.

In an embodiment of the present disclosure, an explicit mode switching information may be sent to the network side once the ground pilot switches the operation mode of the aerial UE 12. To avoid vague understanding of the operation mode of the aerial UE 12, a signaling explicitly indicating the mode switching is completed in the network side may be sent back to the aerial UE 12 from the network side for example from the base station 10.

In addition, according to an embodiment of the present disclosure, the mode switching may be implicitly determined by the aerial UE 12 or the network side. For example, when the aerial UE 12 reports a complete flight path to the network side, for example, the base station 10, the network side will implicitly determine the aerial UE 12 is switched from the non-autonomous to the autonomous mode. In an embodiment of the present disclosure, during a time window, when a control command is received for example from the network side or the ground pilot, the aerial UE 12 may be implicitly determined to be switched from the autonomous mode to the non-autonomous mode. Meanwhile, when no control command is received during the time window, the aerial UE 12 may be implicitly determined to be switched from the non-autonomous mode to the autonomous mode.

Corresponding to the methods performed in the remote side, embodiments of the present disclosure also provide methods of controlling the operation of aerial UEs 12 in the network side.

According to an embodiment of the present disclosure, the method of controlling the operation of aerial UEs 12 may include receiving the flight path information of the aerial UE 12. The network side is aware which operation mode the aerial UE 12 is, and takes relevant actions, in specific time periods based on received flight path information, for example, performing hand over and/or cell reselection of the aerial UE 1 etc. control actions. Specifically, when the aerial UE 12 is in the autonomous mode, the flight path information of the aerial UE 12 is received when a first reporting period expires, or when the path deviation of the aerial UE 12 is larger than a deviation threshold. When the aerial UE 12 is in the non-autonomous mode, the flight path information of the aerial UE 12 is received when a second reporting period less than the first reporting period expires, or at least one of the flight direction and flight speed of the aerial UE 12 changes.

The first reporting period may be indicated by a network entity, such as the base station 10 or is default. For example, the first reporting period may be predefined in the specification or may be indicated by the base station 10 when the connection between the base station 10 and the aerial UE 12 is initiated. In one embodiment of the present disclosure, the first reporting period even may be determined by a first offset period indicated by a network entity, such as a base station 10 and a first default period. According to one embodiment of the present disclosure, the first reporting period may be substantially in a time level no less than a second, such as a one second, which is a relative long reporting interval in wireless communication.

Similarly, the second reporting period may also be indicated by a network entity, such as the base station 10 or is default. For example, the second reporting period may be predefined in the specification or may be indicated by the base station 10 when the connection between the base station 10 and the aerial UE 12 is initiated. In an embodiment of the present disclosure, the second reporting period even may be determined by a second offset period indicated by a network entity, such as a base station 10 and a second default period. According to one embodiment of the present disclosure, the second reporting period may be substantially in a time level no more than a second, such as one millisecond, which is a relative short reporting interval in wireless communication. By configuring the network side to receive flight information from the aerial UEs 12 in the autonomous mode in a relative long reporting period and configuring the network side to receive flight information from the aerial UEs 12 in the non-autonomous mode in a relative short reporting period, embodiments of the present disclosure can ensure the network side to receive enough flight path information to control the operation of aerial UEs 12 while increasing the reporting efficiency and reducing reporting overhead.

According to an embodiment of the present disclosure, the flight path information of the aerial UE 12 can be used to enhance the handover and cell re-selection of the aerial UE 12, which can be performed by the aerial UE 12 or the network side. In particular, when the location information of the relevant base stations 10, i.e., the base stations 10 associated with the aerial UE 12, also known to the aerial UE 12, the flight path information and the location information of the relevant base station 10 can be used to minimize the interference to the aerial UE 12.

Embodiments of the present disclosure also provide a mode switch mechanism for aerial UEs 12. According to an embodiment of the present disclosure, the method of controlling the operation of aerial UEs 12 may further include receiving mode switching information indicating the mode switching of the aerial UE 12 between the autonomous mode and the non-autonomous mode. For example, when the ground pilot switches the operation mode of the aerial UE 12, the ground pilot or the aerial UE 12 may report the mode switching information to the network side. The network side may explicitly indicate to the aerial UE 12 that the reported mode switching is completed in the network side via signaling, that is, the network side has updated the operation mode of the aerial UE 12 to avoid misunderstanding on the operation mode of the aerial UE 12. In addition, in an embodiment of the present disclosure, the network side, for example the base station 10 may transmit signaling indicating the mode switching of the aerial UE 12 between the autonomous mode and the non-autonomous mode based on the control made by itself.

In addition to explicitly indicating mode switching information, according to an embodiment of the present disclosure, the mode switching may be implicitly determined. For example, when the network side, for example, the base station 10, receives a complete flight path reported by the aerial UE 12, the network side may implicitly determine the aerial UE 12 is switched from the non-autonomous to the autonomous mode. In an embodiment of the present disclosure, during a time window, when a control command is received for example from the aerial UE 12 or the ground pilot, the network side may implicitly determine that the aerial UE 12 is switched from the autonomous mode to the non-autonomous mode. Meanwhile, when no control command is received, during the window, the network side may implicitly determine that the aerial UE 12 has been switched from the non-autonomous mode to the autonomous mode.

Embodiments of the present disclosure define the flight path information reporting solutions in both the autonomous operation mode and non-autonomous mode, and the balance between reporting accuracy and reporting overhead is achieved.

In addition, embodiments of the present disclosure define hand over and/or cell reselection based on a threshold of the flight duration in a cell as mobility optimization solutions for aerial UEs.

Embodiments of the present disclosure also define the intended flight path information reporting solutions based on special application scenarios even if the aerial UE is in the non-autonomous operation mode.

Moreover, embodiments of the present disclosure provide a mode switching mechanism for aerial UEs between the autonomous mode and non-autonomous mode. Although the mode switching mechanism is illustrated in combining with the flight path information report, persons skilled in the art should know the mode switching mechanism can be used independently in a wireless network involving aerial UEs.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

Figure 5:
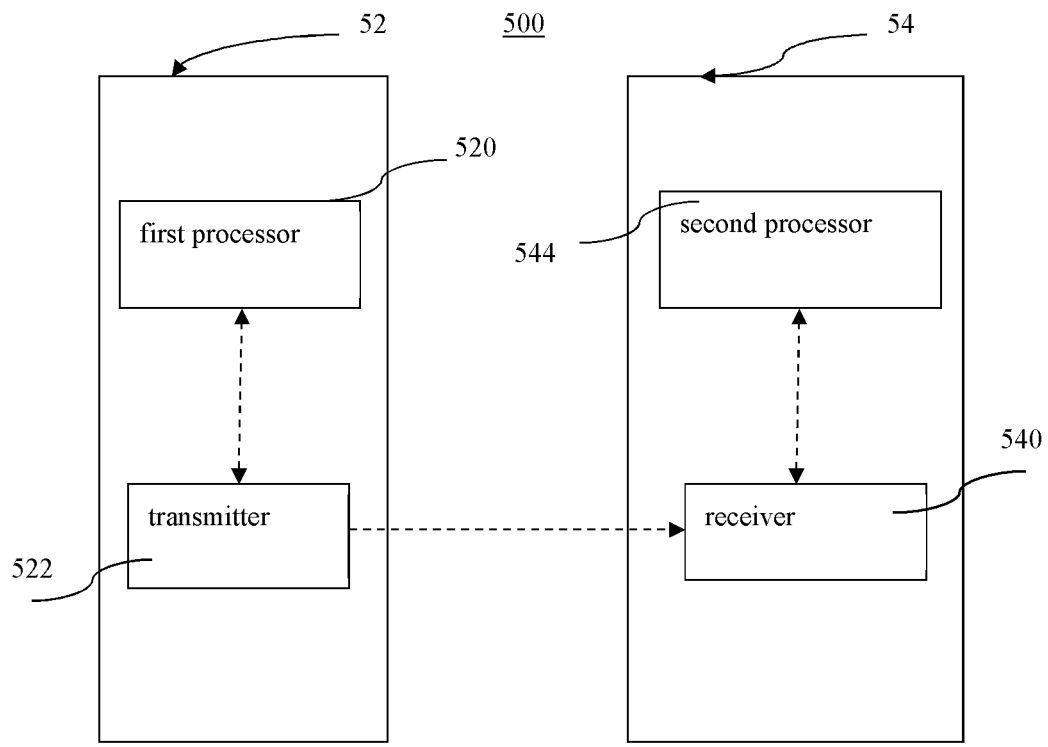
FIG. 5 illustrates a block diagram of a system for controlling the operation of aerial UEs according to an embodiment of the disclosure.

For example, FIG. 5 illustrates a block diagram of a system 500 for controlling the operation of aerial UEs 12 according to an embodiment of the disclosure, which may include a first apparatus 52 for controlling the operation of aerial UEs 12 in the terminal side and a second apparatus 54 for controlling the operation of aerial UEs 12 in the network side. The first apparatus 52 may be an aerial UE 12, or other apparatus that can execute the method for controlling the operation of aerial UEs 12 in the terminal side, such as that illustrated in FIG. 2. The second apparatus 54 may be a base station 10 or a control unit, or other apparatus that can execute the method for controlling the operation of aerial UEs 12 in the network side, such as that illustrated above.

Specifically, the first apparatus 52 may include a first processor 520 in an embodiment of the present disclosure. The first processor 520 may determine whether an aerial UE 12 is in an autonomous mode or in a non-autonomous mode, and determine the flight path information of the aerial UE 12, for example by performing programmed instructions and retrieving relevant data stored in the memory of the aerial UE 12.

The first apparatus 52 may further include a transmitter 522. The transmitter 520 may report the flight path information of the aerial UE 12 to the network side. The flight path information may be reported in a predefined interval or may be event triggered. For example, when the aerial UE is in the autonomous mode, the transmitter 522 may report the flight path information of the aerial UE 12 when a first reporting period expires, that is, the flight path information is reported in an interval. Alternatively, the transmitter 522 may report the flight path information of the aerial UE 12 when the path deviation of the aerial UE 12 is larger than a deviation threshold, that is, the flight path information is reported when at least one defined event is triggered. Similarly, when the aerial UE 12 is in the non-autonomous mode, the transmitter 522 may report the flight path information of the aerial UE 12 when a second reporting period less than the first reporting period expires, or when at least one of the flight direction and flight speed of the aerial UE 12 changes.

The second apparatus 54 may include a receiver 540 in an embodiment of the present disclosure. The receiver 540 may receive the flight path information of the aerial UE 12 reported to the network side. Since the flight path information may be reported in a predefined interval or may be event triggered, the flight path information may be received dependent the flight path information being reported in a predefined interval or may be event triggered. For example, when the aerial UE is in the autonomous mode, the receiver 540 may receive the flight path information of the aerial UE 12 when a first reporting period expires, that is, the flight path information is reported in an interval. Alternatively, the receiver 540 may receive the flight path information of the aerial UE 12 when the path deviation of the aerial UE 12 is larger than a deviation threshold, that is, the flight path information is reported when at least one defined event is triggered. Similarly, when the aerial UE 12 is in the non-autonomous mode, the receiver 540 may receive the flight path information of the aerial UE 12 when a second reporting period less than the first reporting period expires, or when at least one of the flight direction and flight speed of the aerial UE 12 changes.

The second apparatus 54 may further include a second processor 544 in an embodiment of the present disclosure. Based on the received flight path information of the aerial UE 12, the second processor 544 may perform control actions on the terminal side or even the network side, for example control hand over and/or cell resection of the aerial UE 12.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, persons of ordinary skill in the art of the disclosed embodiments would be enabled to make use of the teachings of the present disclosure by simply employing the elements of the independent claims. Accordingly, embodiments of the present disclosure as set forth herein are intended to be illustrative, not limiting. Various changes may be made without departing from the spirit and scope of the present disclosure.

What is claimed is:

1. A method, comprising:
   determining whether an aerial user equipment (UE) is in an autonomous mode or in a non-autonomous mode;
   determining flight path information of the aerial UE; and
   reporting the flight path information of the aerial UE, wherein:
   in response to the aerial UE being in the autonomous mode, reporting the flight path information of the aerial UE in response to a first reporting period expiring or a path deviation of the aerial UE being larger than a deviation threshold; and
   in response to the aerial UE being in the non-autonomous mode, reporting the flight path information of the aerial UE in response to a second reporting period less than the first reporting period expiring or a flight direction and a flight speed of the aerial UE changing.

2. The method according to claim 1, wherein the first reporting period is substantially in a time level no less than a second, and the second reporting period is substantially in a time level no more than a second.

3. The method according to claim 1, wherein the first reporting period is determined by a first offset period indicated by a network entity and a first default period.

4. The method according to claim 1, wherein the second reporting period is determined by a second offset period indicated by a network entity and a second default period.

5. The method according to claim 1, wherein the flight path information includes at least one of the current position of the aerial UE, the target position of the aerial UE, the flight direction of the aerial UE and the flight speed of the aerial UE.

6. The method according to claim 1, further comprising in response to the aerial UE being in the autonomous mode, selecting a base station nearest to the aerial UE for the aerial UE based on the flight path information of the aerial UE and the location information of base stations associated with the aerial UE in response to a reference signal receiving power (RSRP) of the base station measured by the aerial UE meeting a predefined performance criterion.

7. The method according to claim 1, further comprising in response to the aerial UE being in the autonomous mode, selecting a base station for the aerial UE based on the flight path information of the aerial UE and the location information of base stations associated with the aerial UE in response to a reference signal receiving power (RSRP) of the base station measured by the aerial UE being offset better than that of a base station nearest to the aerial UE.

8. The method according to claim 7, wherein the location information of the base stations associated with the aerial UE is stored in at least one of a location server in a core network and a memory of the aerial UE.

9. The method according to claim 7, wherein the location information of the base stations associated with the aerial UE includes one of the following:
the location information of the base stations in a current tracking area of the aerial UE;
the location information of the base stations in a current neighbor cell list of the aerial UE; and
the specific location of a base station requested by the aerial UE.

10. The method according to claim 1, further comprising in response to the aerial UE being in the autonomous mode, receiving a threshold of the flight duration in a cell.

11. The method according to claim 10, wherein in response to an actual flight duration of the aerial UE in a specific cell being larger than the threshold of the flight duration in a cell, the specific cell is the target cell to be handed over to and reselected.

12. The method according to claim 1, further comprising in response to the aerial UE being in the non-autonomous mode, reporting intended flight path information of the aerial UE with a time tag.

13. The method according to claim 12, further comprising receiving a threshold of intended flight period, and reporting the intended flight path information when the intended flight period of the aerial UE is larger than the threshold of intended flight period.

14. The method according to claim 12, further comprising broadcasting the intended flight path information to neighbor aerial UEs of the aerial UE.

15. The method according to claim 12, wherein the intended flight path information include at least one of the following:
a starting time tag, an ending time tag, and the relevant location information of the aerial UE;
a starting position, a flight direction, and velocity information of the aerial UE until receiving a command for changing at least one of the starting position, flight direction, and velocity information; and
series of discrete positions with time tags.

16. The method according to claim 1, further comprising receiving mode switching information indicating the mode switching of the aerial UE between the autonomous mode and the non-autonomous mode.

17. The method according to claim 1, further comprising during a time window, when receiving a control command, determining the aerial UE to be switched from the autonomous mode to the non-autonomous mode; and, in response to no control command being received, determining the aerial UE to be switched from the non-autonomous mode to the autonomous mode.

18. A method, comprising:
receiving flight path information of an aerial UE, wherein:
in response to the aerial UE being in an autonomous mode, receiving the flight path information of the aerial UE in response to a first reporting period expiring or a path deviation of the aerial UE being larger than a deviation threshold; and
in response to the aerial UE being in the non-autonomous mode, receiving the flight path information of the aerial UE in response to a second reporting period less than the first reporting period expiring or a flight direction and a flight speed of the aerial UE changing.

19. The method according to claim 18, wherein the first reporting period is substantially in a time level no less than a second, and the second reporting period is substantially in a time level no more than a second.

20. The method according to claim 18, wherein the first reporting period is determined by a first offset period indicated by a network entity and a first default period.

21. An apparatus comprising:
a processor that:
determines whether an aerial user equipment (UE) is in an autonomous mode or in a non-autonomous mode; and
determines flight path information of the aerial UE; and
a transmitter that reports the flight path information of the aerial UE, wherein:
in response to the aerial UE being in the autonomous mode, the transmitter reports the flight path information of the aerial UE in response to a first reporting period expiring or a path deviation of the aerial UE being larger than a deviation threshold; and
in response to the aerial UE being in the non-autonomous mode, the transmitter reports the flight path information of the aerial UE in response to a second reporting period less than the first reporting period expiring or a flight direction and a flight speed of the aerial UE changing.

22. A apparatus comprising:
a receiver that receives flight path information of an aerial UE, wherein:
in response to the aerial UE being in an autonomous mode, the receiver receives the flight path information of the aerial UE in response to a first reporting period expiring or a path deviation of the aerial UE being larger than a deviation threshold; and in response to the aerial UE is in the non-autonomous mode, the receiver receives the flight path information of the aerial UE in response to a second reporting period less than the first reporting period expiring or a flight direction and a flight speed of the aerial UE changing.

* * * * *